(12) United States Patent
Zeng et al.

(10) Patent No.: US 11,975,483 B2
(45) Date of Patent: May 7, 2024

(54) PART PACKING

(71) Applicants: HEWLETT-PACKARD DEVELOPMENT COMPANY, L.P., Spring, TX (US); INSTITUTO ATLANTICO, Fortaleza-Ceará (BR)

(72) Inventors: Jun Zeng, Palo Alto, CA (US); Alyne Gomes Soares Cantal, Fortaleza (BR); Juan Carlos Catana Salazar, Guadalajara (MX)

(73) Assignee: Hewlett-Packard Development Company, L.P., Spring, TX (US)

( * ) Notice: Subject to any disclaimer, the term of this patent is extended or adjusted under 35 U.S.C. 154(b) by 460 days.

(21) Appl. No.: 17/299,645

(22) PCT Filed: Dec. 19, 2018

(86) PCT No.: PCT/US2018/066461
§ 371 (c)(1),
(2) Date: Jun. 3, 2021

(87) PCT Pub. No.: WO2020/131046
PCT Pub. Date: Jun. 25, 2020

(65) Prior Publication Data
US 2022/0016833 A1    Jan. 20, 2022

(51) Int. Cl.
*B33Y 50/00* (2015.01)
*B29C 64/171* (2017.01)
(Continued)

(52) U.S. Cl.
CPC .......... *B29C 64/171* (2017.08); *B29C 64/386* (2017.08); *B33Y 50/00* (2014.12); *G05B 19/4099* (2013.01); *B29C 64/124* (2017.08); *B29C 64/153* (2017.08); *G05B 2219/49023* (2013.01)

(58) Field of Classification Search
CPC ... B29C 64/171; B29C 64/386; B29C 64/124; B29C 64/153; B29C 64/165; B33Y 50/00; B33Y 10/00; G05B 19/4099; G05B 2219/49023; Y02P 90/30; G06Q 50/04
See application file for complete search history.

(56) References Cited

U.S. PATENT DOCUMENTS

2006/0036561 A1\* 2/2006 Aladahalli ............. G06F 30/18
706/48
2010/0251305 A1\* 9/2010 Kimble ............. H04N 7/17318
725/46

(Continued)

OTHER PUBLICATIONS

Lutters, E. et al., "3D Nesting of Complex Shapes", Procedia CIRP, No. 3 (2012), pp. 26-31, 45th CIRP Conference on Manufacturing Systems 2012.

(Continued)

*Primary Examiner* — Yuhui R Pan
(74) *Attorney, Agent, or Firm* — Shook, Hardy & Bacon L.L.P.

(57) ABSTRACT

Examples of methods for part packing are described herein. In some examples, a first subset and a second subset of a set of parts are determined. In some examples a first packing of the first subset is determined. In some examples, a second packing of the second subset is determined based on the first packing.

15 Claims, 4 Drawing Sheets

(51) Int. Cl.
*B29C 64/386* (2017.01)
*G05B 19/4099* (2006.01)
*B29C 64/124* (2017.01)
*B29C 64/153* (2017.01)

(56) References Cited

U.S. PATENT DOCUMENTS

2013/0290220 A1  10/2013  Tschanz
2014/0358600 A1  12/2014  Vengerov
2015/0170053 A1   6/2015  Miao
2018/0133969 A1*  5/2018  Huang ................ B29C 64/171

OTHER PUBLICATIONS

Wei, L. et al., "A Least Wasted First Heuristic Algorithm for the Rectangular Packing Problem", Computers & Operations Research 36, No. 5 (2009), pp. 1608-1614.

* cited by examiner

PART PACKING

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike some machining processes that often remove material to create the final part. In some additive manufacturing techniques, the build material may be cured or fused.

DETAILED DESCRIPTION

Additive manufacturing may be used to manufacture three-dimensional (3D) parts. A part is an object that may be formed through additive manufacturing. 3D printing is an example of additive manufacturing. Performing additive manufacturing relies on a packing. A packing is information that specifies an arrangement (e.g., position, location, orientation, placement, etc.) of parts in a build volume. A build volume is a 3D space. A build volume may correspond to a physical space in which additive manufacturing may be performed. It may be beneficial to increase packing density in the build volume to increase production and/or reduce manufacturing costs.

Determining an optimal or near-optimal packing may be a difficult problem to solve. For example, very few near-optimal packings may exist over a very large solution space of all possible packings. For instance, naively searching for a near-optimal packing may involve screening a large portion of the solution space, which may be computationally very costly or even impractical. For example, part packing problems may be in the class of nondeterministic polynomial time complete (NP-complete) computational problems, which may be computationally intensive to solve. In NP-complete problems, computational complexity grows exponentially. In an example of an NP-complete problem, assuming a very small batch of 20 parts, just placement of the parts (without rotation) may have a solution space size (e.g., number of possible packings) beyond the order of 1e18. In practice, packing many parts may be costly in terms of time and/or sub-optimal in terms of results.

Some examples of the techniques disclosed herein may address a class of packing problems, where a part size or part sizes are relatively large compared to the build volume. For example, some part sizes may be comparable in size and/or scale to the dimensions of the build volume.

Throughout the drawings, identical reference numbers may designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Figure 1:
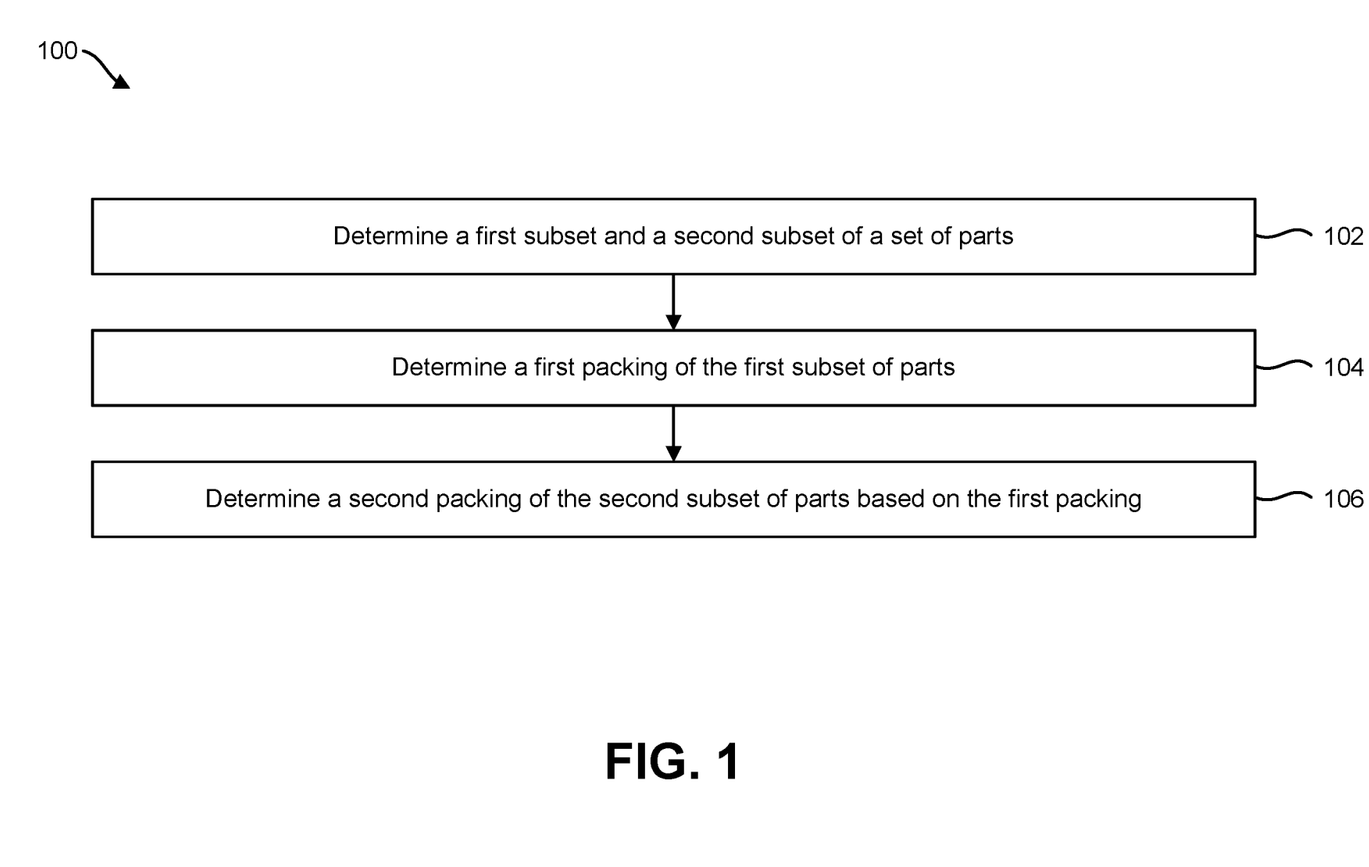
FIG. 1 is a flow diagram illustrating an example of a method for part packing.

FIG. 1 is a flow diagram illustrating an example of a method 100 for part packing. The method 100 and/or a method 100 element or elements may be performed by an apparatus (e.g., electronic device). For example, the method 100 may be performed by the apparatus 202 described in connection with FIG. 2.

The apparatus may determine 102 a first subset and a second subset of a set of parts. For example, the apparatus may obtain information indicating a set of parts (e.g., part set data). Determining 102 the first subset and the second subset of the set of parts may include classifying and/or grouping parts into the first subset and the second subset. The first subset of parts is a group of parts that meets a criterion or criteria. For example, each part in the first subset of parts may have an attribute value or set of attribute values that meets the criterion or criteria. For instance, the first subset of parts may represent a subset of parts that is relatively large in comparison with a build volume. The first subset of parts may be referred to as "significant parts" or "large parts." A second subset is a group of parts that is different from the first subset of parts. In some examples, the second subset may be complementary to the first subset. For instance, the second subset may include the parts of the set of parts that are not in the first subset. In some examples, determining 102 the first subset and the second subset may be a multi-stage subset determination. For instance, multiple partial packings (e.g., solutions) corresponding to multiple groups or subsets may be concatenated to end up with one packing including all of the parts.

In some examples, determining 102 the first subset and the second subset may include determining an attribute value or a set of attribute values for each part of the set of parts. An attribute value is a value (e.g., number) that indicates a metric or characteristic of a part. Examples of attribute values include a dimension value and a density value. For instance, the set of attribute values for a part may include the dimension value and the density value. A dimension value is a value that indicates a dimension or dimensionality of a part. The dimension value may be determined based on or relative to a build volume dimension or dimensions. The density value is a value that indicates a density of a part relative to a build volume.

In some examples, the dimension value may be a dimension ratio determined in accordance with Equation (1).

$$DimensionRatio = \frac{Volume_{bounding}}{Volume_{build}} \quad (1)$$

In Equation (1), DimensionRatio is the dimension ratio of a part, $Volume_{bounding}$ is the volume of the bounding box of the part, and $Volume_{build}$ is a volume of the build volume. In some examples, the bounding box of the part may be defined as a rectangular prism or cuboid with sides (e.g., planes) defined by maximum and minimum points of a part in three dimensions (e.g., planes corresponding to maximum and minimum x values, y values, and z values). It should be noted that while the dimension ratio is given as an example of the dimension value, other values or measures that express a dimensionality of the part relative to a dimensionality of the build volume may be utilized instead of or in addition to the dimension ratio.

In some examples, the density value may be a local density determined in accordance with Equation (2).

$$LocalDensity = \frac{Volume_{mesh}}{Volume_{bounding}} \quad (2)$$

In Equation (2), LocalDensity is the local density of a part, $Volume_{bounding}$ is the volume of a bounding box of the part, and $Volume_{mesh}$ is a volume of a mesh (e.g., 3D mesh model) of the part. It should be noted that while the local density is given as an example of the density value, other values or measures that express a density of the part may be utilized instead of or in addition to the local density.

In some examples, determining 102 the first subset and the second subset may include determining a score for each part of the set of parts based on each set of attribute values. The score is a value used to rank parts, sort parts, and/or classify parts. In some examples, the score is based on a combination of attribute values.

In some examples, the score may be a part weight determined in accordance with Equation (3).

$$PartWeight = LocalDensity * \alpha_{Density} + DimensionRatio * \beta_{Dimension} \quad (3)$$

In Equation (3), PartWeight is the part weight of a part, $\alpha_{Density}$ is weighting value for the LocalDensity, and $\beta_{Dimension}$ is a weighting value for the DimensionRatio. The weighting values determine how much weight is given to each factor of the part weight. In some examples, $\alpha_{Density}=0.3$ and $\beta_{Dimension}=0.7$. Other weighting values may be utilized. It should be noted that while the part weight is given as an example of the score, other values or measures (e.g., combinations of attributes) may be utilized. In some examples, the part weight may be utilized as an attribute value for each part.

In some examples, determining 102 the first subset and the second subset may include sorting (e.g., ranking) the set of parts based on the scores. For example, the apparatus may sort the set of parts into an order (e.g., descending order or ascending order) based on the scores. For instance, the apparatus may sort the set of parts in descending order, such that the parts with the highest scores are first in the order.

In some examples, determining 102 the first subset and the second subset may be based on the sorting. For instance, the first subset may be determined as a number of parts with the highest scores. In some examples, the first subset may include up to a threshold number of parts. For example, the apparatus may determine the first subset as including up to a threshold number of parts with the highest scores. In some examples, the threshold number of parts may be predetermined. For instance, the threshold number of parts may be set to a number (e.g., 2, 3, 4, 5, 6, 7, 8, 9, 10, etc.). In some examples, the threshold number of parts may be determined based on machine learning. For instance, a machine learning model may be trained to determine a threshold number of parts.

In some examples, a part may be selected based on a score threshold. For instance, if a part has a corresponding score that satisfies (e.g., is above) the score threshold, the part may be selected. In some examples, multiple parts may be selected if scores corresponding to the parts satisfy the threshold. For example, the selected part or parts may be included in the first subset. The second subset may include a part or parts that were not selected.

The apparatus may determine 104 a first packing of the first subset. For example, the apparatus may perform a search over a solution space using the first subset. The search may not use the second subset. In some examples, the search may be an exhaustive search over the solution space. In some examples, the apparatus may determine 104 a set of first packings. For example, a number of solutions (e.g., first packings) may be determined and/or stored in some approaches. The set of first packings may be selected, where the first packings that best meet an objective or objectives (e.g., density, height, etc.) may be stored. For instance, a number of packings with best density and/or height may be stored.

The apparatus may determine 106 a second packing of the second subset based on the first packing. For example, determining 106 the second packing based on the first packing may include performing a search for packing the second subset that uses the first packing as a starting point. For instance, determining 106 the second packing of the second subset of parts may include performing a search to place the second subset of parts, where the first packing is fixed. In some examples, the search may be a randomized search. In some examples, the first packing may be treated as a part to be packed. For instance, the volume and shape of the first packing may be used to define a new part that is packed.

In some examples, performing the search may produce a set of candidate packings. A candidate packing is a packing that may be selected (e.g., selected as the second packing or final packing). Determining 106 the second packing may include screening the set of candidate packings to select the second packing. For example, the candidate packing that best satisfies an objective or objectives (e.g., density and/or height) may be selected as the second packing. In some examples, determining 106 the second packing may be performed using a genetic algorithm with density and/or height as an objective or objectives.

In some examples, the second packing may be executed to manufacture the parts. For example, the parts may be manufactured by an apparatus (e.g., 3D printer) in accordance with the second packing. For instance, an apparatus may send the second packing to another device (e.g., 3D printer) or may execute the second packing to manufacture the parts in the second packing. It should be noted that some examples of the techniques described herein may be utilized in a variety of additive manufacturing. Some additive manufacturing techniques may be powder-based and driven by powder fusion. Some additive manufacturing techniques may include metal printing, such as metal jet fusion. Some examples of the approaches described herein may be utilized in powder bed fusion-based additive manufacturing, such as Selective Laser Melting (SLM), Selective Laser Sintering (SLS), Multi-Jet Fusion (MJF), stereolithography (SLA), etc.

Figure 2:
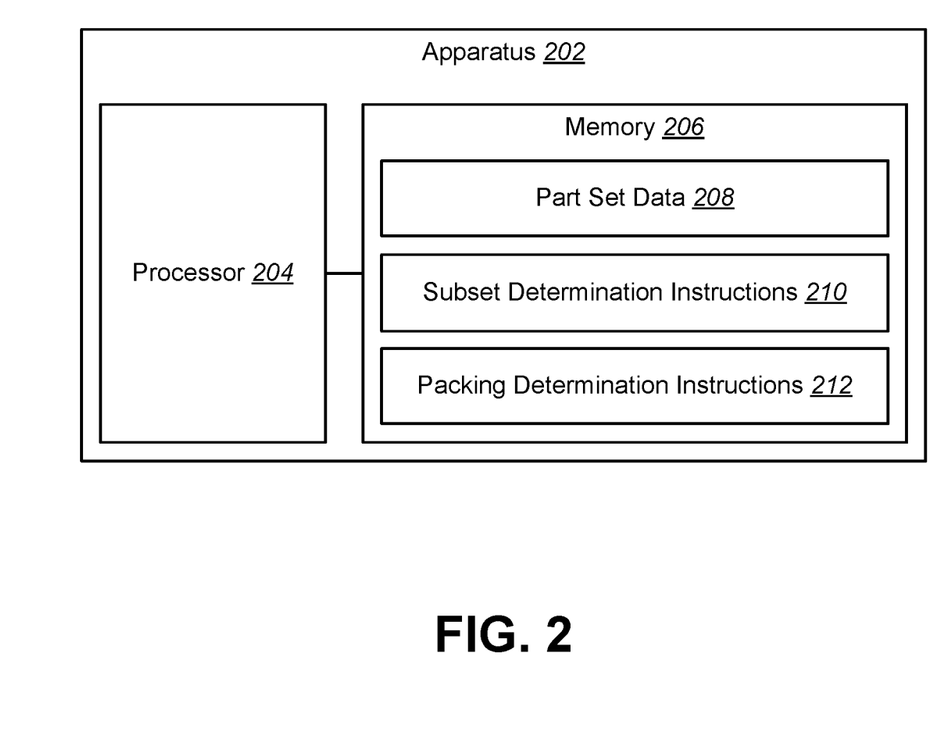
FIG. 2 is a block diagram of an example of an apparatus that may be used in part packing.

FIG. 2 is a block diagram of an example of an apparatus 202 that may be used in part packing. The apparatus 202 may be an electronic device, such as a personal computer, a server computer, a printer, a 3D printer, a smartphone, a tablet computer, etc. The apparatus 202 may include and/or may be coupled to a processor 204 and/or a memory 206. In some examples, the apparatus 202 may be in communication with (e.g., coupled to, have a communication link with) an additive manufacturing device (e.g., a 3D printing device). Alternatively, the apparatus 202 may be an example of a 3D printing device. The apparatus 202 may include additional components (not shown) and/or some of the components described herein may be removed and/or modified without departing from the scope of this disclosure.

The processor 204 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 206. The processor 204 may fetch, decode, and/or execute instructions (e.g., subset determination instructions 210 and/or packing determination instructions 212) stored in the memory 206. Additionally or alternatively, the processor 204 may include an electronic circuit or circuits that include electronic components for performing a function or functions of the instructions (e.g., subset determination instructions 210 and/or packing determination instructions 212). In some examples, the processor 204 may be configured to perform one, some, or all of the functions, operations, elements, methods, etc., described in connection with one, some, or all of FIGS. 1-4.

The memory 206 may be any electronic, magnetic, optical, or other physical storage device that contains or stores electronic information (e.g., instructions and/or data). The memory 206 may be, for example, Random Access Memory (RAM), Electrically Erasable Programmable Read-Only Memory (EEPROM), a storage device, an optical disc, and the like. In some examples, the memory 206 may be volatile and/or non-volatile memory, such as Dynamic Random Access Memory (DRAM), EEPROM, magnetoresistive random-access memory (MRAM), phase change RAM (PCRAM), memristor, flash memory, and the like. In some implementations, the memory 206 may be a non-transitory tangible machine-readable storage medium, where the term "non-transitory" does not encompass transitory propagating signals. In some examples, the memory 206 may include multiple devices (e.g., a RAM card and a solid-state drive (SSD)).

In some examples, the apparatus 202 may include an input/output interface (not shown in FIG. 2) through which the processor 204 may communicate with an external device or devices (not shown), for instance, to receive and store information (e.g., part set data 208) pertaining to an object or objects to be manufactured (e.g., printed). The input/output interface may include hardware and/or machine-readable instructions to enable the processor 204 to communicate with the external device or devices. The input/output interface may enable a wired or wireless connection to the external device or devices. The input/output interface may further include a network interface card and/or may also include hardware and/or machine-readable instructions to enable the processor 204 to communicate with various input and/or output devices, such as a keyboard, a mouse, a display, another apparatus, electronic device, computing device, etc., through which a user may input instructions into the apparatus 202.

In some examples, the memory 206 may store part set data 208. The part set data 208 may be obtained (e.g., received) from an external device and/or may be generated on the apparatus 202. For example, the processor 204 may execute instructions (not shown in FIG. 2) to receive the part set data 208 from an external device.

The part set data 208 may include data indicating a number of parts and shapes (e.g., 3D models, dimensions, etc.) of parts. For example, the parts set data 208 may indicate a set of parts for packing and/or manufacture.

In some examples, the processor 204 may execute subset determination instructions 210 to determine attribute values of the set of parts. For example, the processor 204 may determine a dimension value (e.g., dimension ratio), a density value (e.g., local density), and/or other attribute value(s). For instance, the processor 204 may determine the DimensionRatio and the LocalDensity for each part as described in connection with Equations (1)-(2) based on the part set data 208.

In some examples, the processor 204 may execute the subset determination instructions 210 to determine scores based on the attribute values of the set of parts. For example, the processor 204 may determine a score (e.g., part weight) for each of the parts based on the set of attribute values for each of the parts. For instance, the processor 204 may determine a PartWeight for each part as described in connection with Equation (3).

In some examples, the processor 204 may execute the subset determination instructions 210 to determine a first subset and a second subset of the set of parts based on the scores. For example, the processor 204 may sort (e.g., rank) the set of parts in an order according to the scores. In some examples, the processor 204 may determine the first subset as any part(s) that meet a criterion or criteria. For instance, the processor 204 may determine the first subset as up to a threshold number of highest ranked parts according to the scores. The second subset may be the other parts remaining in the set of parts.

In some examples, the processor 204 may execute the subset determination instructions 210 to determine a first subset and a second subset as follows. The processor 204 may compare an attribute value to an attribute value threshold for each part of the set of parts. Each part with an attribute value that satisfies the attribute value threshold may be further considered for inclusion in the first subset. For example, the processor 204 may compare a dimension value to a dimension threshold (e.g., 0.5) for each part of the set of parts. Additionally or alternatively, the processor 204 may compare a density value to a density threshold (e.g., 0.3) for each part of the set of parts. In some examples, the processor 204 may sort any parts with an attribute value that satisfies the attribute value threshold to produce a sorted subset. For example, the processor 204 may sort (e.g., rank) the parts (that satisfy the attribute value threshold(s)) based on the score corresponding to each part.

In some approaches, the processor 204 may calculate the score for those parts that satisfy the attribute value threshold(s) or may calculate the score for all parts in the set of parts. For example, determining the scores may include calculating a weighted sum of a set of attribute values for each of the set of parts with the attribute value that satisfies the attribute value threshold. The processor 204 may produce a sorted subset in an order based on the scores. In some examples, the processor 204 may select up to a threshold number of parts from the sorted subset to produce the first subset. For instance, if there is the same number of parts in the sorted subset as, or more parts in the sorted subset, than the threshold number, the processor 204 may select those parts with the best (e.g., highest) scores within the threshold number to produce the first subset (and exclude other parts from the first subset, for instance). If there are fewer parts in the sorted subset than the threshold number, the processor 204 may select the parts in the sorted subset as the first subset. The second subset may include the parts that are not included in the first subset.

In some examples, the processor 204 may execute the packing determination instructions 212 to determine a first packing of the first subset in a volume (e.g., build volume). For example, the processor 204 may perform a search for packings for the first subset of parts. In some implementations, the search may be an exhaustive search (e.g., an entire solution space may be searched). The first packing may be selected as the packing that best satisfies objectives (e.g., higher density, lower height, etc.). In some examples, the processor 204 may determine a set of first packings. For example, the processor 204 may build n factorial (n!) packings for the first subset of n parts. For instance, the processor 204 may select a set of first packings from the search that best meet an objective or objectives (e.g., higher density, lower height, etc.). The set of first packings may be stored in the memory 206. In some examples, the processor 204 may append the second subset of parts to each of the n! packings.

In some examples, the processor 204 may apply a set of policies to determine the first subset of parts. A policy is a criterion or set of criteria for determining a packing. Examples of policies may include the attribute values, attribute value thresholds, and/or objectives described herein. For example, different policies based on different attribute values (e.g., dimension value and density value) may be independently or iteratively applied to determine the first subset. For instance, a first policy may be applied to determine a first set of first packings based on a dimension value. A second policy may be applied to determine a second set of first packings based on a density value. The second set of first packings may be appended to the first set of first packings. The combination of the sets of first packings (or a selection thereof based on an objective or objectives) may be stored in memory 206. The second packing may be determined based on the combination of sets of first packings.

In some examples, the processor 204 may execute the packing determination instructions 212 to determine a second packing of the second subset in the volume based on the first packing. For example, the processor 204 may utilize the first packing or set of first packing(s) as starting points for a search for packings of the second subset. For instance, the processor 204 may perform a randomized search to place the second subset of parts around the locations of the first subset of parts in the first packing(s). It should be noted that in some examples of the techniques described herein, multiple sets (e.g., more than two sets, subsets, or groups) and/or packings may be used. For example, a first packing corresponding to a first subset (with X largest parts) may be determined, then a second packing corresponding to a second subset (with Y next largest parts) may be determined based on the first packing, then a third packing corresponding to a third subset (with Z next largest parts) may be determined based on the first packing and the second packing, and so on for a number of packings and/or subsets.

Figure 3:
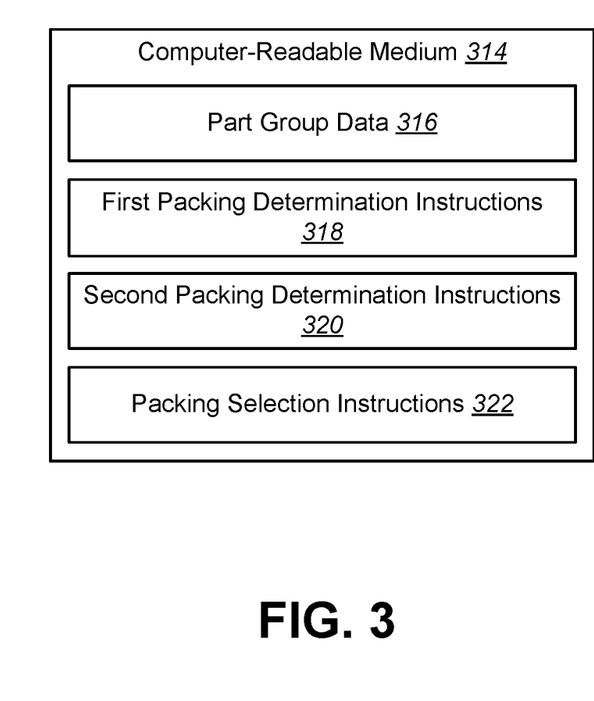
FIG. 3 is a block diagram illustrating an example of a computer-readable medium for performing part packing.

FIG. 3 is a block diagram illustrating an example of a computer-readable medium 314 for performing part packing. The computer-readable medium is a non-transitory, tangible computer-readable medium 314. The computer-readable medium 314 may be, for example, RAM, EEPROM, a storage device, an optical disc, and the like. In some examples, the computer-readable medium 314 may be volatile and/or non-volatile memory, such as DRAM, EEPROM, MRAM, PCRAM, memristor, flash memory, and the like. In some implementations, the memory 206 described in connection with FIG. 2 may be an example of the computer-readable medium 314 described in connection with FIG. 3.

The computer-readable medium 314 may include code (e.g., data and/or instructions). For example, the computer-readable medium 314 may include part group data 316, first packing determination instructions 318, second packing determination instructions 320, and/or packing selection instructions 322.

The part group data 316 may include information indicating groups of parts. For example, the part group data 316 may indicate a first group of parts, where the first group of parts may be classified as significant parts in accordance with criteria. For instance, operations may be performed as described herein to determine the first group of parts based on a set of attribute values and/or a score for each part. The first subset described herein may be an example of the first group of parts. The part group data 316 may also indicate a second group of parts that does not meet the criteria to be in the first group. The second subset described herein may be an example of the second group of parts.

In some examples, the first packing determination instructions 318 are code to cause a processor to determine a first set of packings of the first group of parts. For example, the processor may execute the first packing determination instructions 318 to determine the first set of packings by performing an exhaustive search of the solution space for the first group of parts.

In some examples, the second packing determination instructions 320 are code to cause the processor to use each packing of the first set of packings to determine a second set of packings of the second group of parts. For example, the processor may execute the second packing determination instructions 320 to determine the second set of packings using random placements (e.g., using a genetic algorithm).

In some examples, the packing selection instructions 322 are code to cause the processor to select a packing from the second set of packings. The selected packing may be a second packing (e.g., "final" packing). For example, the processor may execute the packing selection instructions 322 to screen the second set of packings based on an objective or objectives to select the second packing.

In some examples, the computer-readable medium 314 may include code to cause the processor to apply a set of policies to determine the first group of parts. For example, the processor may execute instructions to independently or iteratively apply multiple policies (e.g., criteria) to determine the first group of parts.

Figure 4:
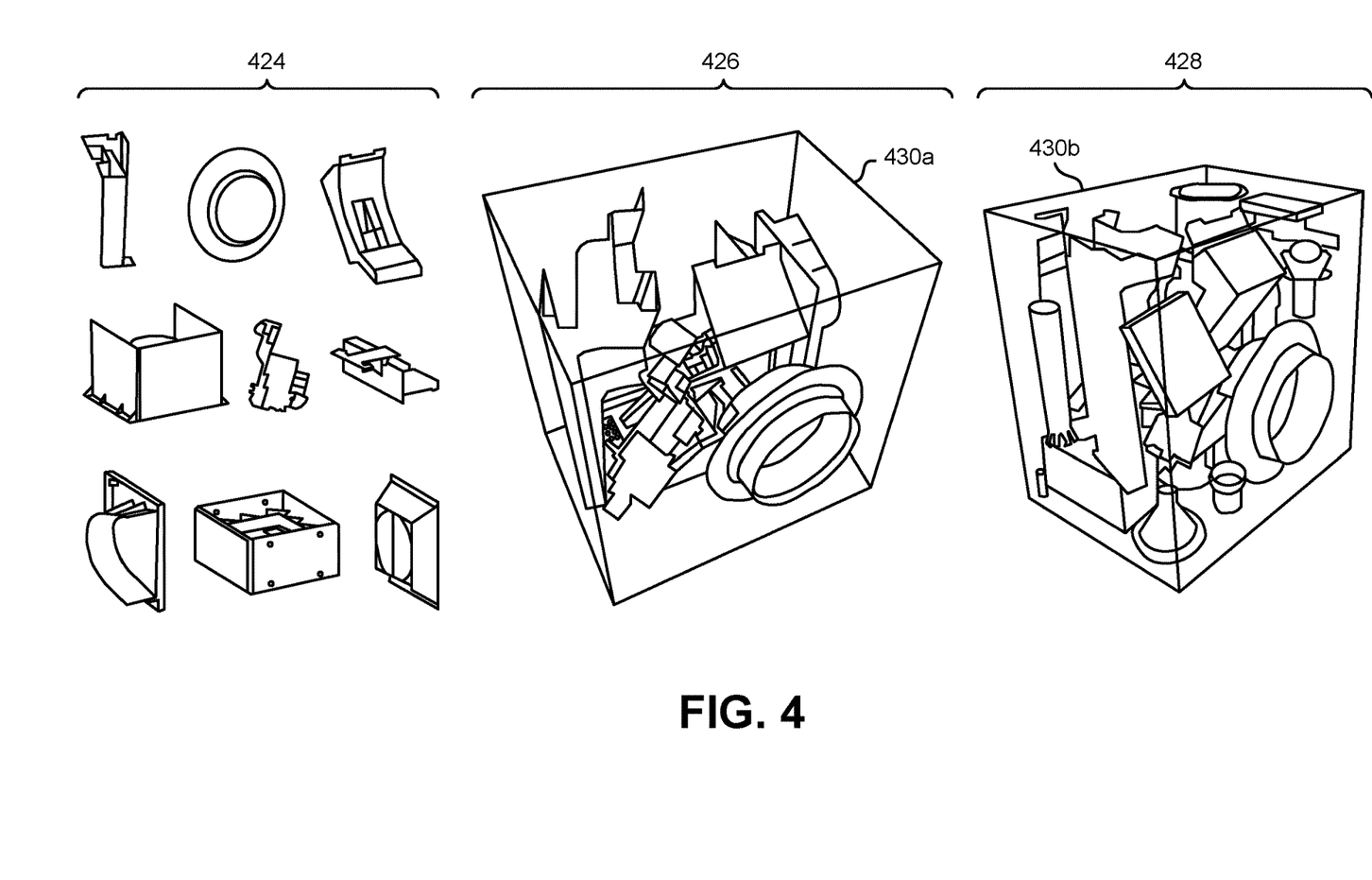
FIG. 4 is a diagram illustrating an example of a first subset of parts, a first packing, and a second packing.

FIG. 4 is a diagram illustrating an example of a first subset of parts 424, a first packing 426, and a second packing 428. FIG. 4 also illustrates an example of a build volume 430a with the first packing 426, and the build volume 430b with the second packing 428.

As described above, determining an optimal or near-optimal packing for a set of parts may be difficult in some approaches due to the nature of the packing problem and the associated computational intensity. It should also be noted that some shape-based packing algorithms may achieve a higher packing density than some bounding box-based approaches, but some shape-based packing algorithms are more computationally demanding, since more data may be utilized to model the shape of parts than just a bounding box.

Some of the techniques described herein may reduce the computational intensity by utilizing a greedy strategy. For example, some of the techniques described herein may analyze the parts to be packed and determine (e.g., identify) a first subset of the parts (e.g., a subset of the solution space). The size of the solution space for the first subset of parts may be smaller than the entire solution space, and may have a higher chance to produce a near-optimal solution. Some of the techniques described herein may be based on multiple tiers of greedy heuristics that greatly reduce the solution space, which may allow determining near-optimal solutions with reduced computing time.

Some approaches for part packing may include a multi-objective optimization engine using a genetic algorithm. A genetic algorithm is a procedure (e.g., partial search procedure) to produce a solution to a search problem. A genetic algorithm may utilize an objective or objectives to produce a solution. In some examples, a genetic algorithm may be utilized as a shape-based packing algorithm that can achieve a higher packing density compared to a purely bounding box-based approach. The objectives implemented may include packing density and height (e.g., z-axis height).

When parts to be packed are relatively small compared to the build volume, there may be multiple different part placements that can provide near-optimal packing density. In these cases, there may be a practical probability to obtain a near-optimal solution via sampling the entire solution space guided by the genetic algorithm. However, sampling the entire solution space may be less efficient when packing a build batch dominated by several relatively large parts. For instance, the entire solution space may include 1e18 potential packings. Accordingly, it may be beneficial to reduce the search space from the entire solution space.

Near-optimal packings may be dominated by placements (e.g., optimal placements) of relatively large parts. Some of the techniques disclosed herein may utilize a greedy strategy that starts with identifying a packing or packings for the relatively large parts. In some examples, a policy or policies may be utilized to classify and/or sort a set of parts to create arrangements that may fit in a build volume. For example, a policy may include a criterion or criteria to classify parts that can be considered large in relation to the build volume. For instance, significant (e.g., relatively large) parts may allow for fewer placements for packing. For each part in a set of parts, for example, a set of attribute values may be determined. Parts that have an attribute value or values larger than a threshold or thresholds may be deemed significant.

In some examples, the set of attribute values may include a local density. For instance, the local density may be a part volume divided by a bounding box volume. Parts with relatively large surface-to-volume ratio (e.g., shell objects) may have a smaller local density. In some examples, the set of attribute values may include an axial dimension ratio. For instance, the axial dimension ratio may be determined by calculating a ratio of a part bounding box and a build volume for each axis dimension, where the maximum ratio may be the axial dimension ratio (which may be stored or recorded for the part). In some examples, a part may be considered significant or comparable to the build volume if at least one of its dimensions is greater than a threshold (e.g., 1/d) of the corresponding build volume axis. In an example, assume a build volume with x, y, and z dimensions (in millimeters (mm)) of 380 mm×284 mm×380 mm and that d=2. Also assume a part having a bounding box with dimensions 190 mm×211 mm×288 mm. In this example, a ratio between the bounding box and the build volume in the y dimension is 211/284≈0.74>1/2, and a ratio in z dimension is 288/380≈0.76>1/2. Accordingly, the axial dimension ratio may be 0.76, which is greater than a threshold value of 1/2, which may indicate that the part is a significant part. The axial dimension ratio may be utilized in addition to or alternatively from the DimensionRatio described in connection with Equation (1).

In some examples, another attribute value or attribute values may be utilized. For example, a part surface to volume ratio may be utilized in addition to or alternatively from the dimension value and/or density value. In some examples, scoring may be performed based on the attribute values. The scores may be utilized to determine significant parts (e.g., a first subset of parts). For example, the scores may be utilized to determine the first subset of parts 424. For instance, parts may be sorted in descending order according to the scores (e.g., PartWeights), where a number of parts may be selected. In some examples, determining 102 a first subset of parts may be accomplished as described using the local density, dimension ratio, axial dimension ratio, and/or part surface to volume ratio. Additionally or alternatively, the subset determination instructions 210 may include instructions to determine the first subset of parts as described using the local density, dimension ratio, axial dimension ratio, and/or part surface to volume ratio. Additionally or alternatively, the part group data 316 may include a first subset of parts determined as described using the local density, dimension ratio, axial dimension ratio, and/or part surface to volume ratio.

A first packing 426 of the first subset of parts 424 may be determined. In some examples, the first packing determination may be based on objectives of increasing (e.g., maximizing) packing density and/or reducing (e.g., minimizing) total z-height). Because the part count of the first subset of parts 424 may be relatively small, the potential packings (e.g., solution space) may also be relatively small. Moreover, the number of near-optimal solutions may accordingly be relatively very small (e.g., from 0.01% to less than 1% of a total solution space). In some examples, determining the first packing 426 may include performing an exhaustive search over all of the potential packings (e.g., entire solution space) for the first subset. This may be a practical approach due to the relatively small size of the solution space. Accordingly, the first packing 426 may include the first subset of parts 424 (e.g., significant parts) in the build volume 430a. As described herein, a set of first packings may be determined in some examples. The set of first packings may include an optimal packing(s) and/or near-optimal packing(s). In some examples, determining 104 a first packing may be accomplished as described using the objective(s). Additionally or alternatively, the packing determination instructions 212 may include instructions to determine the first packing as described using the objective(s). Additionally or alternatively, the first packing determination instructions 318 may include instructions to determine the first packing as described using the objective(s).

All or some of the first packings (e.g., a number of the best arrangements) may be utilized as parts positioned in the build volume during further packing determination (e.g., using a genetic algorithm). Each first packing (e.g., near-optimal partial solution) for the first subset of parts 424 (e.g., significant parts) may be used as a root solution. A root solution is a partial packing of the parts in the first subset of parts 424 from which other packings may be determined (e.g., built on top of). For example, for each first packing (e.g., root solution), a candidate packing or set of candidate packings may be determined as a combination of the first packing and a randomized packing for the second subset (e.g., remaining parts in the set of parts). For example, a candidate packing may be expressed as CandidatePacking= RootSolution+RandomPacking, where CandidatePacking is the candidate packing, RootSolution is the first packing, and RandomPacking is a randomized solution for the second subset of parts. In some examples, determining 106 a second packing may be accomplished as described based on a first packing or packings as a root solution(s), where the second packing may be selected from candidate packings. Additionally or alternatively, the packing determination instructions 212 may include instructions to determine the second packing as described using a first packing or packings, where the second packing may be selected from candidate packings. Additionally or alternatively, the second packing determination instructions 320 and/or the packing selection instructions 322 may include instructions to determine the second packing as described using a first packing or packings, where the second packing may be selected from candidate packings.

Some examples of the techniques described herein may reduce the size of the search space significantly. For example, a greedy strategy may be utilized, in which there is a good chance to reach a near-optimal second packing if the first packing includes a proper placement of the first subset (e.g., the significant parts).

Some aspects of the some of the techniques disclosed herein are described as follows. In some examples, a set of parts (e.g., list of parts) to be packed may be received. For each part, a set of attribute values and a score may be computed. Based on the score and a threshold, the first subset may be determined. The first subset of parts may be packed to produce a set of packings. In some examples, determining the set of packings may utilize an exhaustive search. A number of near-optimal partial packings may be selected from the set of packings (based on an objective or objectives such as packing density and/or height) to form a set of first packings (e.g., root solutions). For each first packing, randomly generated packings may be appended for the second subset (e.g., the rest of parts in the set of parts) to form a set of candidate packings. For example, each first packing may be utilized to generate a number of (e.g., N) candidate packings. The candidate packings may be screened to determine a second packing (e.g., a near-optimal final solution). For example, the candidate packings may be screened based on an objective or objectives (e.g., packing density, height, etc.) to determine the second packing from the candidate packings.

Some aspects of the techniques disclosed herein may be beneficial. For example, analyzing and ranking parts, treating parts differently based on the attributes of the parts, and/or multi-stage packing based on greedy heuristics may be beneficial by improving the functioning of a computing device (e.g., processor, computer, printer, etc.). For instance, the aforementioned aspects may improve the efficiency by which near-optimal packings may be computed. Moreover, some aspects of the techniques disclosed herein may be applied to another technological field besides generic computing. For example, the second packing described herein may be executed by a 3D printer to manufacture the parts with improved packing density, which allows increased manufacture.

It should be noted that while various examples of systems and methods are described herein, the disclosure should not be limited to the examples. Variations of the examples described herein may be implemented within the scope of the disclosure. For example, functions, aspects, or elements of the examples described herein may be omitted or combined.

The invention claimed is:

1. A method, comprising:
   determining a first subset and a second subset of a set of parts;
   from the first subset, determining a plurality of root solutions wherein each root solution represents a first packing of the first subset into a three-dimensional (3D) build volume;
   from each of the plurality of root solutions, determining a plurality of candidate solutions, the plurality of candidate solutions based on packing the second subset into each of the plurality of root solutions; and
   determining a second packing for the set of parts within the 3D build volume based on screening the plurality of candidate solutions.

2. The method of claim 1, wherein determining the first subset and the second subset comprises:
   determining a set of attribute values for each part of the set of parts;
   determining a score for each part of the set of parts based on each set of attribute values;
   sorting the set of parts based on the scores for each part of the set of parts; and
   determining the first subset and the second subset based on the sorting.

3. The method of claim 2, wherein the set of attribute values includes a density value and a dimension value for each part.

4. The method of claim 2, wherein the first subset includes up to a threshold number of the set of parts, and the second subset is complementary to the first subset in the set of parts.

5. The method of claim 4, wherein the threshold number is determined based on machine learning.

6. The method of claim 1, wherein determining the first packing of the first subset comprises performing a search over a solution space.

7. The method of claim 6, wherein the search is an exhaustive search over the solution space.

8. The method of claim 1, wherein determining the second packing of the second subset of the set of parts comprises performing a search to place the second subset of the set of parts, wherein the first packing is fixed.

9. The method of claim 8, wherein the search is a randomized search.

10. The method of claim 8, wherein performing the search produces a set of candidate packings, and wherein determining the second packing comprises screening the set of candidate packings to select the second packing.

11. An apparatus, comprising:
    a memory
    a processor coupled to the memory, wherein the processor is to:
    determine scores based on attribute values of a set of parts;
    determine a first subset and a second subset of the set of parts based on the scores;
    from the first subset, determine a plurality of root solutions wherein each root solution represents a first packing of the first subset into a three-dimensional (3D) build volume;
    from each of the plurality of root solutions, determine a plurality of candidate solutions, the plurality of candidate solutions based on packing the second subset into each of the plurality of root solutions; and
    determine a second packing for the set of parts within the 3D build volume based on screening the plurality of candidate solutions.

12. The apparatus of claim 11, wherein determining the first subset and the second subset comprises:
    comparing an attribute value to an attribute value threshold for each part of the set of parts;
    sorting any parts with the attribute value that satisfies the attribute value threshold to produce a sorted subset; and
    selecting up to a threshold number of parts from the sorted subset to produce the first subset.

13. The apparatus of claim 12, wherein determining scores comprises calculating a weighted sum of a set of attribute values for each of set of parts with the attribute value that satisfies the attribute value threshold.

14. A non-transitory tangible computer-readable medium storing executable code, comprising:
- code to cause a processor to determine a plurality of root solutions wherein each root solution represents a first packing of a first subset of a set of parts into a three-dimensional (3D) build volume;
- code to cause the processor to use each root solution to determine a plurality of candidate solutions, the plurality of candidate solutions based on packing a second subset of the set of parts into each of the plurality of root solutions; and
- code to cause the processor to select from the plurality of candidate solutions, a second packing for the set of parts within the 3D build volume.

15. The computer-readable medium of claim 14, further comprising code to cause the processor to apply a set of policies to determine the first subset of the set of parts.

* * * * *